UNITED STATES PATENT OFFICE

2,424,664

N-BETA-CYANOETHYLALKANE-SULFONAMIDES

David Malcolm McQueen, Newark, Del., assignor to E. I. du Pont de Nemours & Company, Wilmington, Del., a corporation of Delaware No Drawing. Application June 15, 1944, Serial No. 540,535

9 Claims. (Cl. 260—464)

This invention relates to new compositions of matter and more particularly to N-beta-cyanoethyl amides, i. e. amides in which a beta-cyanoethyl group is attached to amide nitrogen.

The reaction of acrylonitrile with amides containing active methylene groups to form C-substituted beta-cyanoethyl derivatives of these amides has been described by Bruson and Riener in the Journal of the American Chemical Society, 65, 23 (1943). Insofar as is now known, N-beta-cyanoethyl amides having the beta-cyanoethyl group attached to amide nitrogen are a new class of compounds which have not hitherto been prepared.

This invention has as an object the preparation of new compositions of matter. A further object is the provision of N-beta-cyanoethyl amides, i. e. amides in which the beta-cyanoethyl group is attached to amide nitrogen. A further object is the provision of a method of preparation for these N-beta-cyanoethyl amides. Other objects will appear hereinafter.

These objects are accomplished by reacting acrylonitrile in the presence of an alkaline condensing agent with an amide having a hydrogen-bearing amido nitrogen and having the amide group as the sole acrylonitrile-reactive group, and isolating the resulting N-beta-cyanoethyl amide. The products are all N-beta-cyanoethyl amides having a beta-cyanoethyl group attached to the amide nitrogen. One group of the compounds falling under this general class which are derived from the monoamides can be represented by the following formula:

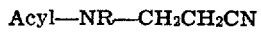

Acyl—NR—CH$_2$CH$_2$CN wherein R is hydrogen, hydrocarbon or a beta-cyanoethyl group. Likewise amides containing two or more hydrogen bearing amide groups react with acrylonitrile to give compounds having an NRCH$_2$CH$_2$CN group for each amide group. Thus, polysulfonamide (R(SO$_2$NR'H))$_n$ wherein R is a hydrocarbon radical of valence $n$, $n$ being an integer, and R' is hydrogen or hydrocarbon yield compounds of the formula:

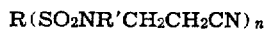

R(SO$_2$NR'CH$_2$CH$_2$CN)$_n$ wherein R, R' and $n$ are as before.

The preferred embodiment of this invention comprises the aliphatic saturated hydrocarbon N-beta-cyanoethylated carbonamides, phosphonamides and sulfonamides, i. e. compounds in which the carbon, sulfur or phosphorus of the amide group or groups is attached to a saturated aliphatic hydrocarbon radical. Because of the ease with which the N-beta-cyanoethylated sulfonamides can be prepared, these constitute a still more preferred class.

In the most satisfactory method of carrying out the invention, the amide is dissolved in an inert solvent, i. e. a solvent unreactive with acrylonitrile and the amide, for example dioxane, an alkaline condensing agent is added, and acrylonitrile is added slowly, with agitation, maintaining the temperature of the reaction mixture within the range of 20° to 30° C. Since the reaction is exothermic, cooling is usually necessary to control the reaction and to prevent undesirable side reactions which occur at higher temperatures. After neutralization of the alkaline condensing agent, the N-beta-cyanoethylated amide is preferably isolated by distillation.

The more detailed practice of the invention is illustrated by the following examples wherein parts given are by weight. There are, of course, many forms of the invention other than these specific embodiments.

Example I

Forty-two and four-tenths (42.4) parts of acrylonitrile is added dropwise to a stirred suspension of 23.6 parts of acetamide in 100 parts of dioxane containing 2 parts of aqueous 40% trimethylbenzylammonium hydroxide. The reaction temperature is maintanied below 30° C. by occasional cooling. As the reaction proceeds, the acetamide slowly dissolves, forming a clear solution. After standing overnight, the reaction mixture is neutralized with hydrochloric acid and the solvent removed by evaporation at reduced pressure. Upon distillation of the residue at 3 mm. pressure, 15.5 parts of acetamide is recovered and 26 parts of a higher boiling fraction obtained. Redistillation of this latter fraction at 2 mm. pressure yields 16.3 parts of a product boiling at 210° to 225° C., representing a 72% yield of N,N-bis(beta-cyanoethyl)acetamide based on acetamide. Analysis shows this product to contain 25.2% nitrogen and to have a molecular weight of 179 to 188. The calculated values for a product resulting from the reaction of two mols of acrylonitrile with one mol of acetamide are 25.4% nitrogen and a molecular weight of 165.

The compound was characterized as N,N-bis-(betacyanoethyl)acetamide by reduction and hydrolysis to the known bis-(3-aminopropyl)amine.

Example II

Fifteen and one-half (15.5) parts of acrylonitrile is added dropwise to a stirred suspension of 20 parts of a mixture of butanemonosulfonamides in 73 parts of dioxane containing five parts of aqueous 40% trimethylbenzylammonium hydroxide to which two parts of water is added. The reaction temperature is maintained below 30° C. by occasional cooling. After standing overnight, the reaction mixture is neutralized with hydrochloric acid and the solvent is removed by evaporation under reduced pressure. Upon distillation at 3 mm. pressure, 18 parts of a viscous, water-insoluble product boiling at 195° to 206° C. is obtained. The product is found by analysis to contain 16.1% sulfur and to have a molecular weight of 216. The values calculated for the product obtained by the reaction of one mol of acrylonitrile with one mol of butanesulfonamide are 16.8% sulfur and a molecular weight of 190. The product, which is completely soluble in aqueous 5% sodium hydroxide, corresponds to a yield of 51% of theory of mono-N-beta-cyanoethylbutanesulfonamide.

*Example III*

Twenty-one and two-tenths (21.2) parts of acrylonitrile is added dropwise to a stirred solution of 27.4 parts of a mixture of butanemonosulfonamides in 100 parts of dioxane containing six parts of aqueous 40% trimethylbenzylammonium hydroxide. The reaction temperature is maintained below 30° C. by occasional cooling. After standing overnight, the reaction mixture is neutralized with hydrochloric acid and the solvent removed by evaporation under reduced pressure. Upon distillation of the residue at 2 mm. pressure, 31.5 parts of a product boiling at 225° to 233° C. is obtained. This product crystallizes on standing to a white, waxy solid having a melting point of 46° to 49° C. Upon analysis, the product is found to contain 16.8% nitrogen; 13.2% sulfur and has a molecular weight of 235. The theoretical values for a material obtained by the addition of two mols of acrylonitrile to one mol of butanesulfonamide are 17.3% nitrogen, 13.2% sulfur, and a molecular weight of 243. The analytical values indicate that a di- addition product is obtained, and on this basis, the yield is 55% of theory. The product is insoluble in both water and aqueous 5% sodium hydroxide.

The products of this invention are viscous liquid to solid products. The products from pure, low molecular weight amides are crystalline, or can be made to crystallize. The products from amide mixtures such as the mixture of sulfonamides resulting from the treatment of No. 40 white oil with sulphur dioxide and chlorine, followed by treatment with ammonia, are viscous oils or amorphous solids. In general the products are soluble in dioxane and insoluble in water. The lowest molecular weight products such as the N,N-bis-(beta-cyanoethyl)acetamide are water soluble. In general, mono-substituted N-beta-cyanoethyl sulfonamides are also soluble in dilute alkali.

The amides which can be reacted with acrylonitrile in accordance with this invention all have at least one hydrogen on the amide nitrogen and are otherwise free from active (Zerewitenoff) hydrogen, i. e. are free from groups other than the amide groups which react with acrylonitrile, for example —OH, SH, —NH2, NHR and active methylene groups. Preferably, they are aliphatic amides which have a saturated aliphatic hydrocarbon group attached to the carbon, sulfur, or phosphorus of the amide group.

Among the amides which are useful in this invention are the aliphatic carbonamides, sulfonamides and phosphonamides including methanesulfonamide, ethanesulfonamide, propanesulfonamide, butanesulfonamide, N-methylbutanesulfonamide, N-ethylbutanesulfonamide, N-methylpropanesulfonamide, N-methyl-4 - chlorobutanesulfonamide, propanedisulfonamide, butanedisulfonamide, chlorocetanesulfonamide, the polysulfonamides derived from paraffin wax containing on the average from two to six sulfonamide groups per molecule and similar polysulfonamides derived from hydrocarbon oils such as No. 40 white oil sulfonamides, acetamide, propionamide, butyramide, adipamide, succinamide, N-methylacetamide, N-ethylbutyramide, N,N'-diethyladipamide, acrylamide, polymethacrylamide, monoamide of diethylphosphonic acid, diamide of ethylphosphonic acid, and the like. These amides may be substituted with chlorine, alkoxy or thio-ether groupings which do not interfere with the reaction with acrylonitrile. The preferred amides are the saturated aliphatic hydrocarbon sulfonamides. Suitable sulfonamides can be prepared according to U. S. Patent No. 2,334,186.

The products obtained by the reaction of the above described amides with acrylonitrile are N-beta-cyanoethyl derivatives of these amides. They may be either the mono- or the di-beta-cyanoethylated amides, depending on the amount of acrylonitrile used and the reaction conditions employed. In addition to the N-beta-cyanoethyl amides of the examples, the following are illustrative of the new compounds of this invention:

N - methyl - N - beta - cyanoethylbutanesulfonamide,
N-beta-cyanoethylchlorobutanesulfonamide,
4 - methoxy - di(N - beta - cyanoethyl)butanesulfonamide,
Tetra(N - beta - cyanoethyl)propanedisulfonamide,
Tetra(N-beta-cyanoethyl)adipamide,
N-methyl-N-beta-cyanoethylacetamide,
3 - methoxy - di(N - beta - cyanoethyl)propionamide,
Poly(N - beta - cyanoethyl) polychloroparaffin wax polysulfonamides.

The alkali condensing agents useful in this reaction are the oxides, hydroxides, amides and alcóholates of the alkali metals or the strongly basic, non-metallic hydroxides, for example quaternary ammonium hydroxides. These agents include sodium ethylate, sodium methylate, potassium hydroxide, sodium hydroxide, tetramethylammonium hydroxide and the like. A preferred condensing agent is the trimethylbenzylammonium hydroxide employed in the examples. Only small amounts of condensing agents are required and from 1% to 10% based on the total weight of the reaction materials is usually sufficient.

Temperatures from 10° to 50° C. may be used in this reaction although temperatures under 30° C. are preferred. The reaction is exothermic so that cooling is required during the first part of the condensation in order to control the reaction and to prevent undesirable polymerization of the acrylonitrile or other side reactions. The reaction is generally carried out in an inert solvent, for example dioxane or ether which does not react with the acrylonitrile.

The N-beta-cyanoethyl amides are useful as insecticides or as plasticizers. By virtue of the reactivity of the nitrile group, these beta-cyanoethylated amides are useful as intermediates in the preparation of new amides, carboxylic acids, esters, amines and amidines.

The above description and examples are intended to be illustrative only and no unnecessary limitations should be understood therefrom.

What is claimed is:

1. An N - beta - cyanoethylbutanemonosulfonamide.

2. N,N - bis(beta - cyanoethyl)butanemonosulfonamide.

3. Process for the preparation of sulfonamides having on the sulfonamido nitrogen a beta-cyanoethyl group which comprises reacting acrylonitrile in the presence of an alkaline condensing agent with a sulfonamide which has hydrogen on sulfonamido nitrogen and which is, apart from the sulfonamido, completely saturated lower aliphatic hydrocarbon.

4. Process for the preparation of sulfonamides having on the sulfonamido nitrogen a beta-cyanoethyl group which comprises reacting acrylonitrile in the presence of an alkaline condensing agent with a lower alkane sulfonamide having hydrogen on sulfonamido nitrogen.

5. Process for the preparation of monosulfonamides having on the sulfonamido nitrogen a beta-cyanoethyl group which comprises reacting acrylonitrile in the presence of an alkaline condensing agent with a lower alkane monosulfonamide having hydrogen on sulfonamido nitrogen.

6. Process which comprises reacting acrylonitrile in the presence of an alkaline condensing agent with a butanemonosulfonamide and isolating the resulting butanemonosulfonamide having, on the sulfonamido nitrogen, a beta-cyanoethyl group.

7. An N - beta - cyanoethylalkanemonosulfonamide wherein the alkane is a lower alkane.

8. An N,N - bis(beta - cyanoethyl) alkane - monosulfonamide wherein the alkane is a lower alkane.

9. A compound

wherein Alk is a lower alkyl radical and R is a member of the class consisting of hydrogen, lower alkyl, and betacyanoethyl radicals.

DAVID MALCOLM McQUEEN.

REFERENCES CITED

The following references are of record in the file of this patent:

UNITED STATES PATENTS

| Number | Name | Date |
|---|---|---|
| 2,223,916 | Martin | Dec. 3, 1940 |
| 2,017,537 | Hoffman et al. | Oct. 15, 1935 |
| 2,249,135 | Hechenbleikner et al. | July 15, 1941 |

OTHER REFERENCES

Delepine, "Bull. de la Soc. Chim. de France" (3), vol. 29, p. 1193. Bruson et al., Jour. Am. Chem. Society, vol. 65, pp. 23–27 (1943).

Certificate of Correction

Patent No. 2,424,664.                                    July 29, 1947.

DAVID MALCOLM McQUEEN

It is hereby certified that errors appear in the printed specification of the above numbered patent requiring correction as follows: Column 1, line 42, for "polysulfonamide (R" read *polysulfonamides R*; column 2, line 30, for "maintanied" read *maintained*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.* ethylated amides are useful as intermediates in the preparation of new amides, carboxylic acids, esters, amines and amidines.

The above description and examples are intended to be illustrative only and no unnecessary limitations should be understood therefrom.

What is claimed is:

1. An N - beta - cyanoethylbutanemonosulfonamide.

2. N,N - bis(beta - cyanoethyl)butanemonosulfonamide.

3. Process for the preparation of sulfonamides having on the sulfonamido nitrogen a beta-cyanoethyl group which comprises reacting acrylonitrile in the presence of an alkaline condensing agent with a sulfonamide which has hydrogen on sulfonamido nitrogen and which is, apart from the sulfonamido, completely saturated lower aliphatic hydrocarbon.

4. Process for the preparation of sulfonamides having on the sulfonamido nitrogen a beta-cyanoethyl group which comprises reacting acrylonitrile in the presence of an alkaline condensing agent with a lower alkane sulfonamide having hydrogen on sulfonamido nitrogen.

5. Process for the preparation of monosulfonamides having on the sulfonamido nitrogen a beta-cyanoethyl group which comprises reacting acrylonitrile in the presence of an alkaline condensing agent with a lower alkane monosulfonamide having hydrogen on sulfonamido nitrogen.

6. Process which comprises reacting acrylonitrile in the presence of an alkaline condensing agent with a butanemonosulfonamide and isolating the resulting butanemonosulfonamide having, on the sulfonamido nitrogen, a beta-cyanoethyl group.

7. An N - beta - cyanoethylalkanemonosulfonamide wherein the alkane is a lower alkane.

8. An N,N - bis(beta - cyanoethyl) alkane - monosulfonamide wherein the alkane is a lower alkane.

9. A compound

Alk—SO₂NRCH₂CH₂CN wherein Alk is a lower alkyl radical and R is a member of the class consisting of hydrogen, lower alkyl, and betacyanoethyl radicals.

DAVID MALCOLM McQUEEN.

REFERENCES CITED

The following references are of record in the file of this patent:

UNITED STATES PATENTS

| Number | Name | Date |
|--------|------|------|
| 2,223,916 | Martin | Dec. 3, 1940 |
| 2,017,537 | Hoffman et al. | Oct. 15, 1935 |
| 2,249,135 | Hechenbleikner et al. | July 15, 1941 |

OTHER REFERENCES

Delepine, "Bull. de la Soc. Chim. de France" (3), vol. 29, p. 1193. Bruson et al., Jour. Am. Chem. Society, vol. 65, pp. 23–27 (1943).

---

Certificate of Correction

Patent No. 2,424,664.　　　　　　　　　　　　　　　　July 29, 1947.

DAVID MALCOLM McQUEEN

It is hereby certified that errors appear in the printed specification of the above numbered patent requiring correction as follows: Column 1, line 42, for "polysulfonamide (R" read *polysulfonamides R*; column 2, line 30, for "maintanied" read *maintained*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.*